(12) United States Patent
Li

(10) Patent No.: US 11,886,265 B2
(45) Date of Patent: Jan. 30, 2024

(54) SOURCE DEVICE AND POWER CONTROL METHOD OF SOURCE DEVICE

(71) Applicant: Sharp NEC Display Solutions, Ltd., Tokyo (JP)

(72) Inventor: Zhenliu Li, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 80 days.

(21) Appl. No.: 17/587,527

(22) Filed: Jan. 28, 2022

(65) Prior Publication Data

US 2022/0155843 A1    May 19, 2022

Related U.S. Application Data

(63) Continuation of application No. PCT/JP2019/032959, filed on Aug. 23, 2019.

(51) Int. Cl.
 *G06F 1/3206* (2019.01)
 *G06F 1/3287* (2019.01)
 *G06F 1/3296* (2019.01)

(52) U.S. Cl.
 CPC .......... *G06F 1/3206* (2013.01); *G06F 1/3287* (2013.01); *G06F 1/3296* (2013.01)

(58) Field of Classification Search
 CPC .... G06F 1/3206; G06F 1/3287; G06F 1/3296; G06F 1/266
 See application file for complete search history.

(56) References Cited

U.S. PATENT DOCUMENTS

2017/0279270 A1* 9/2017 Motoki .................. H02M 3/04

FOREIGN PATENT DOCUMENTS

| JP | 2017-525053 A | 8/2017 |
|---|---|---|
| JP | 2017-174138 A | 9/2017 |
| JP | 2018-110476 A | 7/2018 |
| JP | 2018-133976 A | 8/2018 |
| JP | 2019-012479 A | 1/2019 |
| WO | WO 2016/019498 A1 | 2/2016 |

OTHER PUBLICATIONS

International Search Report (ISR) (PCT Form PCT/ISA/210), in PCT/JP2019/032959, dated Oct. 8, 2019.

* cited by examiner

*Primary Examiner* — Kim Huynh
*Assistant Examiner* — Cory A. Latham
(74) *Attorney, Agent, or Firm* — MCGINN I.P. LAW GROUP, PLLC

(57) ABSTRACT

A source device includes a first control unit to perform a negotiation with the sink device based on power standard and perform control of supplying power to a sink device based on first power information determined by the negotiation. The source device includes a power detection unit to detect power required by the sink device and includes a second control unit to receive the first power information including voltage and current values of power determined by the negotiation and of second power information including voltage and current values of power detected. The second control unit generates third power information, including voltage and current values based on the inputs of the first power information and the second power information and on the predetermined power standard. The second control unit instructs the first control unit to perform negotiation again on the basis of the third power information generated.

18 Claims, 6 Drawing Sheets

FIG. 2

| POWER | 5V | 9V | 15V | 20V |
|---|---|---|---|---|
| POWER≤15W | (POWER/5) A | | | |
| 15W<POWER≤27W | 3A | (POWER/9) A | | |
| 27W<POWER≤45W | 3A | 3A | (POWER/15) A | |
| 45W<POWER≤100W | 3A | 3A | 3A | (POWER/20) A |

FIG. 4

| POWER | | 5V | 9V | 15V | 20V |
|---|---|---|---|---|---|
| POWER≤15W | | (POWER/5) A → (POWER/5) A−0.5...... | | | |
| | THRESHOLD VALUE OF PROTECTION FUNCTION | (POWER/5) A*120% | | | |
| 15W<POWER≤27W | | | (POWER/9) A → (POWER/9) A−0.5...... | | |
| | THRESHOLD VALUE OF PROTECTION FUNCTION | | (POWER/9) A*120% | | |
| 27W<POWER≤45W | | | | (POWER/15) A → (POWER/15) A−0.5...... | |
| | THRESHOLD VALUE OF PROTECTION FUNCTION | | | (POWER/15) A*120% | |
| 45W<POWER≤100W | | | | | (POWER/20) A → (POWER/20) A−0.5...... |
| | THRESHOLD VALUE OF PROTECTION FUNCTION | | | | (POWER/20) A*120% |

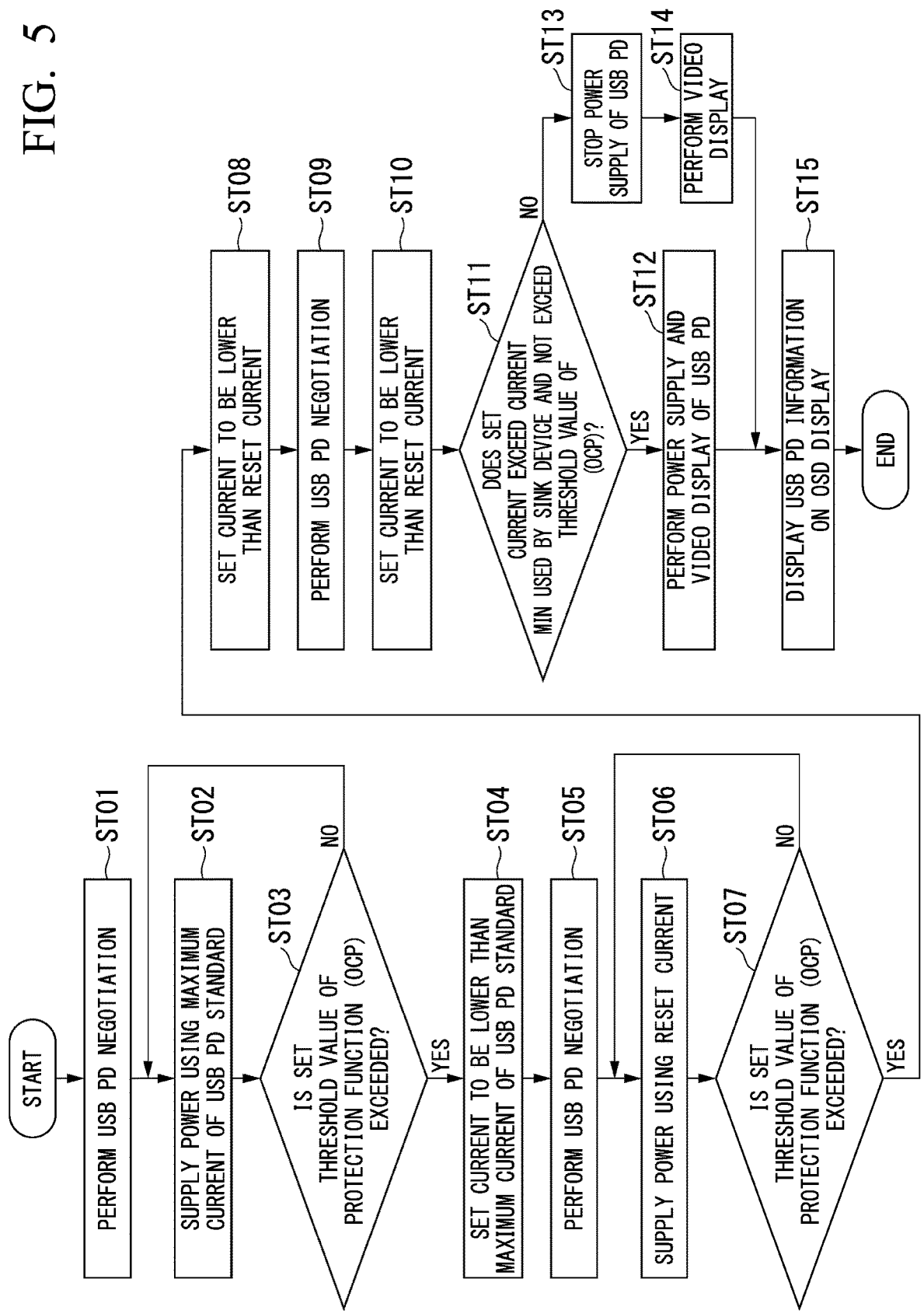

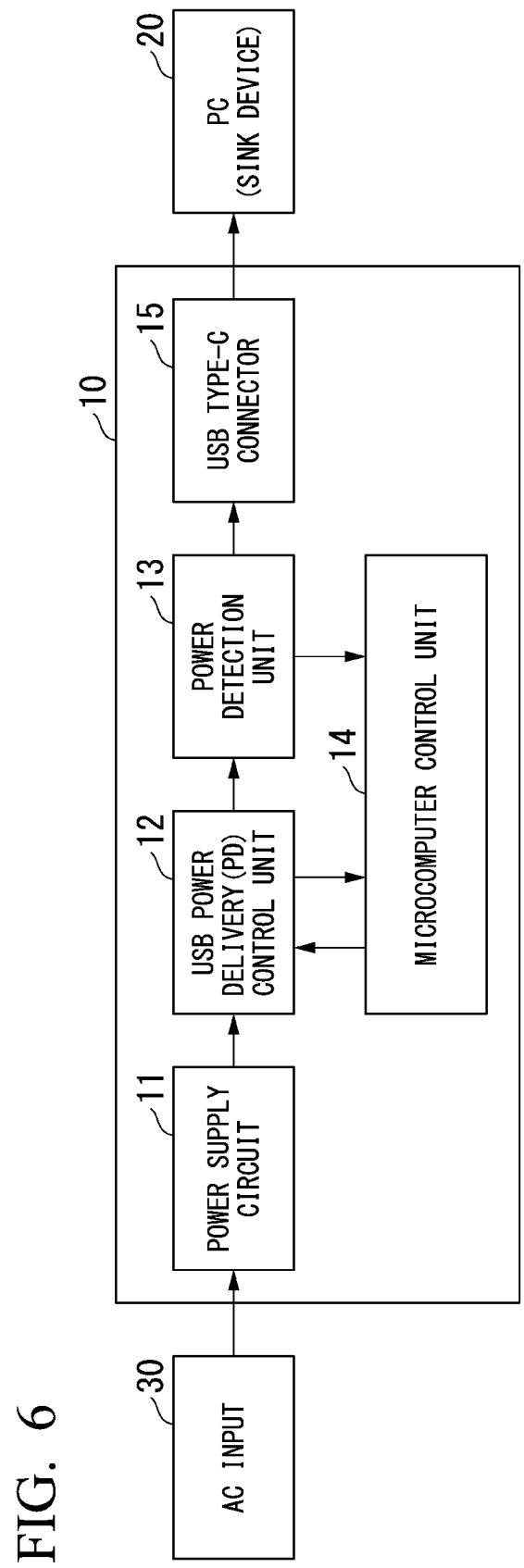

SOURCE DEVICE AND POWER CONTROL METHOD OF SOURCE DEVICE

TECHNICAL FIELD

The present invention relates to a source device and a power control method of a source device.

BACKGROUND ART

According to "USB Power Delivery 3.0," which is a power supply standard corresponding to USB Type-C, it is required to supply power from a source device (a charger) to a sink device (a host device).

In a supply of power using the USB Type-C, a source device (hereinafter referred to as a source device) communicates (negotiates) with a sink device (hereinafter referred to as a sink device), the source device informs the sink device of voltage and current values that it can supply after determining voltage and current values of power supplied from the source device to the sink device, and the sink device selects voltage and current values to be received among the notified voltage and current combinations to notify them to the source device.

The source device receives this and starts to supply power to the sink device.

For example, Patent Literature 1 discloses a plurality of supplies of power. That is, Patent Literature 1 discloses a supply of power performed by a mobile device 2 (a source device) to two external devices, a first external device 700 and a second external device 800 (a sink device) (refer to paragraphs [0064] and [0065] of Patent Literature 1, and FIG. 3).

In Patent Literature 1, a first connector 110 and a second connector 210 of a mobile device 2 conform to the USB Type-C standard.

In addition, a first control terminal 114 of the first connector 110 and a second control terminal 214 of the second connector 210 are terminals to which a CC line in the USB Type-C standard is connected.

Moreover, a first interface and control unit 150 of the mobile device 2 acquires information on the power supply specifications of the first external device 700 from the first external device 700 by executing a negotiation conforming to the USB Power Delivery standard, and stores the acquired information on the power supply specifications of the first external device 700 in an external device information holder 500.

As a result, it is disclosed that, even when a new first external device 700 is connected to the first connector 110, DC power can be exchanged using the information on the power supply specifications of the new first external device 700.

In addition, a second interface and control unit 250 of the mobile device 2 acquires information on the power supply specifications of the second external device 800 from the second external device 800 by executing a negotiation conforming to the USB Power Delivery standard, and stores the acquired information on the power supply specifications of the second external device 800 in the external device information holder 500.

As a result, it is disclosed that, even when a new second external device 800 is connected to the second connector 210, DC power can be exchanged using the information on the power supply specifications of the new second external device 800.

That is, Patent Literature 1 discloses a plurality of power supplies.

On the other hand, Patent Literature 2 discloses a control method in which a charger 110 (a source device) supplies power to or charges a device 120 (a sink device) (refer to paragraph [0028] of Patent Literature 2 and FIG. 1).

In Patent Literature 2, a control unit 114 of the charger 110 controls a power supply 112 of the charger 110 such that it provides a default power output level, such as 5V and 1 A, to supply power to or charge the device 120, and selectively adjusts an output level of the power supply 112 according to configuration information received from a connected electronic device 120 through communication connection.

Furthermore, it is described that the charger 110 in some embodiments can be operated to modify or update charger capability information 117 of the charger 110 on the basis of status information 118 of the charger 110 or on the basis of other inputs. In other words, there is a description that a current value of a negotiation target may be modified or updated.

CITATION LIST

Patent Literature

[Patent Literature 1]
Japanese Unexamined Patent Application, First Publication No. 2018-110476
Published Japanese Translation No. 2017-525053 of the PCT International Publication

SUMMARY OF INVENTION

Technical Problem

However, according to a sink device, a source device and a sink device perform communication (negotiation), and a current value (for example, a current value to which ripple noise or the like is applied and which exceeds a current value determined before a supply of power) that exceeds a current value determined before a supply of power may be required from the source device.

In this case, a USB Power Delivery control unit that performs a negotiation with the source device to protect the source device and the sink device automatically activates an overcurrent protection (OCP; Over CURRENT Protection) function, and stops a supply of power from the source device to the sink device (stops a supply of power).

However, when the supply of power is stopped on the USB Power Delivery standard, a problem that data communication and video output are also stopped at the same time may not be considered.

The present invention has been made in view of such circumstances described above, and provides a source device capable of continuously performing a supply of power to a sink device by adjusting a power supply capacity thereof, and a power control method of a source device.

Solution to Problem

In order to solve the problems described above, a source device according to one aspect of the present invention is a source device that is connected to a sink device, and supplies power to the sink device, and includes a first control unit configured to perform a negotiation with the sink device on the basis of a predetermined power standard, and to perform control of supplying power to the sink device on the basis of first power information determined by the negotiation, a power detection unit configured to detect power required by the sink device, and a second control unit into which the first power information including a voltage value and a current value of power determined by the negotiation is input from the first control unit and second power information including a voltage value and a current value of power detected is input from the power detection unit, and which is configured to generate third power information including a voltage value and a current value on the basis of both types of the input power information and the predetermined power standard, and to instruct the first control unit to perform the negotiation again using the generated third power information.

In addition, a control method of a source device according to another aspect of the present invention is a control method of a source device that is connected to a sink device and supplies power to the sink device, and includes a first control process of performing, by a first control unit, a negotiation with the sink device on the basis of a predetermined power standard, and performing control of supplying power to the sink device on the basis of first power information determined by the negotiation, a detection process of detecting, by a power detection unit, power required by the sink device, and an instruction process of receiving the first power information including a voltage value and a current value of power determined by the negotiation from the first control unit, and second power information including a voltage value and a current value of power detected from the power detection unit, generating third power information including a voltage value and a current value on the basis of the received both types of power information and the predetermined power standard, and instructing the first control unit to perform the negotiation again using the generated third power information.

Advantageous Effects of Invention

According to one aspect of the present invention, it is possible to provide a source device capable of continuously supplying power to a sink device by adjusting a power supply capacity of the source device, and a power control method of a source device.

BRIEF DESCRIPTION OF DRAWINGS

FIG. 2 is a diagram which shows an example of a standard of USB POWER Delivery.

FIG. 4 is a diagram for describing an adjustment of a power supply capacity performed by a second control unit 14 shown in FIG. 3.

FIG. 5 is a control flowchart which shows a control operation of the source device according to an embodiment of the present invention.

FIG. 6 is a block diagram which shows a basic configuration example of the source device according to the embodiment of the present invention.

DESCRIPTION OF EMBODIMENTS

Figure 1:
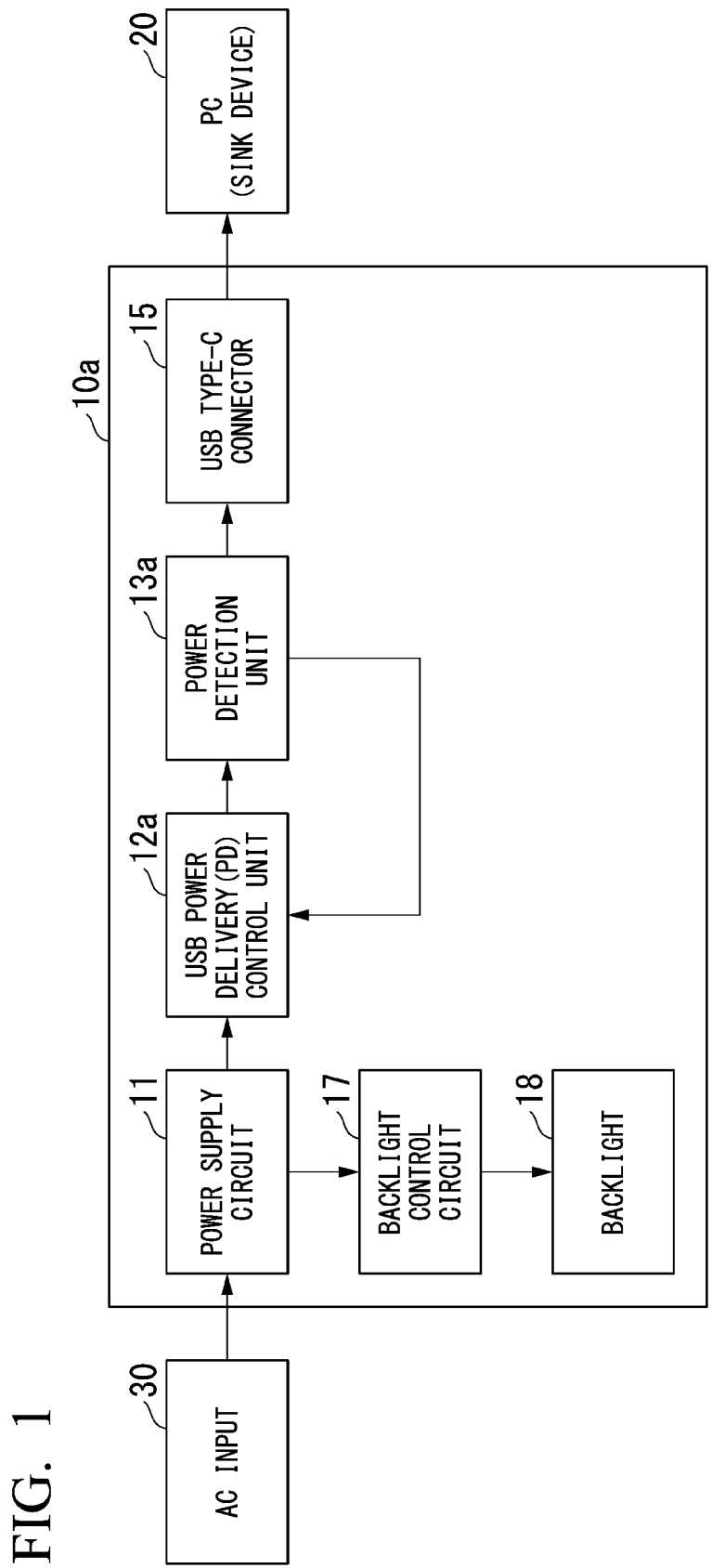
FIG. 1 is a block diagram which shows a configuration example of a conventional source device.

Hereinafter, a conventional source device, problems thereof, and embodiments of the present invention will be described in order with reference to the drawings. First, FIG. 1 is a block diagram which shows a configuration example of the conventional source device.

An LCD monitor (source device) 10*a* (hereinafter referred to as a source device 10*a*) is configured to include a power supply circuit 11, a USB Power Deliverly (PD) control unit 12*a* (hereinafter referred to as a first control unit 12*a*), a power detection unit 13*a*, and a USB Type-C connector 15, a backlight control circuit 17, and a backlight 18.

The power supply circuit 11 converts AC power to be input from an external AC INPUT 30 into DC power, supplies first power of the converted DC power to the backlight 18 via the backlight control circuit 17, and supplies second power of the converted DC power to a PC (a sink device) (hereinafter referred to as a sink device 20), which is an external device, via the power detection unit 13*a* and the USB Type-C connector 15.

The power detection unit 13*a* detects the power required by the sink device 20.

The USB Type-C connector 15 is a USB Type-C standard connector.

The USB Type-C connector 15 has one end connected to a power detection unit 13 and the other end connected to one end of a USB cable to which the sink device 20 is connected. In addition, the other end of the USB cable is connected to a connector corresponding to the USB Type-C connector 15 of the sink device 20.

Here, the USB cable is a USB Type-C standard cable. The USB cable includes a VBUS line (a bus power supply line) for supplying power to a second power VBUS, a signal line for transmitting and receiving VBUS power information, a plurality of signal lines for transmitting and receiving video signals, and a ground line. Moreover, the USB cable may be provided with other signal lines or the like.

FIG. 2 is a diagram which shows an example of a standard for USB Power Delivery. In addition, FIG. 2 is a diagram which shows an example of setting for supply of power (a power supply mode), for example, setting for supply of power of USB Power Delivery. For example, when power supplied using VBUS is set to 15 W (watt) or less, if a VBUS voltage is set to 5 V (volt), a VBUS current is set to (power/5) A (ampere).

The VBUS power information (a VBUS voltage value and a VBUS current value) includes information indicating a VBUS voltage value and a VBUS current value shown in FIG. 2.

The first control unit 12*a* is a device that supplies VBUS power, the VBUS power information, video signals, and the like to the sink device 20.

The first control unit 12*a* controls each signal transmitted and received via the USB Type-C connector 15. For example, when the first control unit 12*a* is connected to the sink device 20 via the USB Type-C connector 15, it executes negotiation (negotiation of power information and determination of power information) with the sink device 20, and transmits the VBUS power information output by the source device 10*a*.

In addition, the first control unit 12*a* performs control such that the transmitted VBUS power information is output to the power supply circuit 11 and the second power VBUS is output to the power supply circuit 11.

The backlight 18 includes, for example, a plurality of LEDs arranged in a straight line as a light source. In the backlight 18, first power output by the power supply circuit 11 is input via the backlight control circuit 17, and a plurality of LEDs are turned on using the first power as a power supply to emit backlight light. The backlight 18 includes, for example, an optical member such as a light guide plate and an optical sheet, and irradiates a back surface of an image display (not shown in FIG. 1) with backlight emitted by the plurality of LEDs via the optical member. Moreover, the backlight 18 includes, for example, a plurality of switches, and irradiates the back surface of the image display with backlight by turning on or off the plurality of switches based on a backlight control signal input from the backlight control circuit 17. The image display receives the backlight light emitted by the backlight 18 from the back surface and controls a transmission rate of the backlight light by using a liquid crystal display, thereby, for example, displaying an image corresponding to a video signal processed by a video processing circuit (not shown) performing predetermined processing such as changing a resolution and adjusting an image quality for a video signal input from the outside. That is, the backlight 18 emits light for displaying an image.

For example, the image corresponding to a video signal may be output to the sink device 20 via the USB Type-C connector 15 as a video output. In addition, the sink device 20 may have a charger charged with power supplied from the source device 10a, a video output may be input from the source device 10a via the USB Type-C connector 15, the cable, and a connector corresponding to the USB Type-C connector 15 using the power with which the charger is charged, and the input video output may be displayed in a video on a display of a host device.

The backlight control circuit 17 generates a backlight control signal and outputs it to the backlight 18, for example, by referring to information stored in an embedded memory based on information indicating the first power supplied by the power supply circuit 11 to the backlight 18. The backlight control signal is a control signal for turning on (connecting) or turning off (disconnecting) the plurality of switches included in the backlight 18. The memory embedded in the backlight control circuit 17 stores a table or the like in which information indicating the first power is associated with an on or off state of each switch.

The configuration of the conventional source device 10a has been described above, but the problem will be described next.

The supply of power by the USB Type-C connector 15 (USB Power Delivery) is performed by performing negotiation between the first control unit 12a of the source device 10a and the sink device 20 by a USB protocol, and determining corresponding power (a voltage and a current) to start power supply.

However, the sink device 20 may request a current value (for example, a current value exceeding a current value determined before a supply of power by applying ripple noise or the like thereto) exceeding a current value (refer to FIG. 2) determined before the supply of power by performing communication (negotiation) between the source device 10a and the sink device, to the source device 10a.

In this case, to protect the source device 10a and the sink device 20, the first control unit 12a of the source device 10a automatically activates an overcurrent protection (OCP; Over CURRENT Protection) function, and stops the supply of power from the source device 10a to the sink device 20 (stops the supply of power).

However, a problem that a data communication and a video output are stopped at the same time when the supply of power is stopped on a USB Power Delivery standard is not taken into consideration.

Therefore, in the source device according to the embodiment of the present invention described below, a microcomputer control unit (CPU) newly provided in the source device sets a threshold value of a protection function (OCP), thereby adjusting a power supply capacity of the first control unit of the source device, and continuing to perform the supply of power to the sink device 20.

First Embodiment

Figure 3:
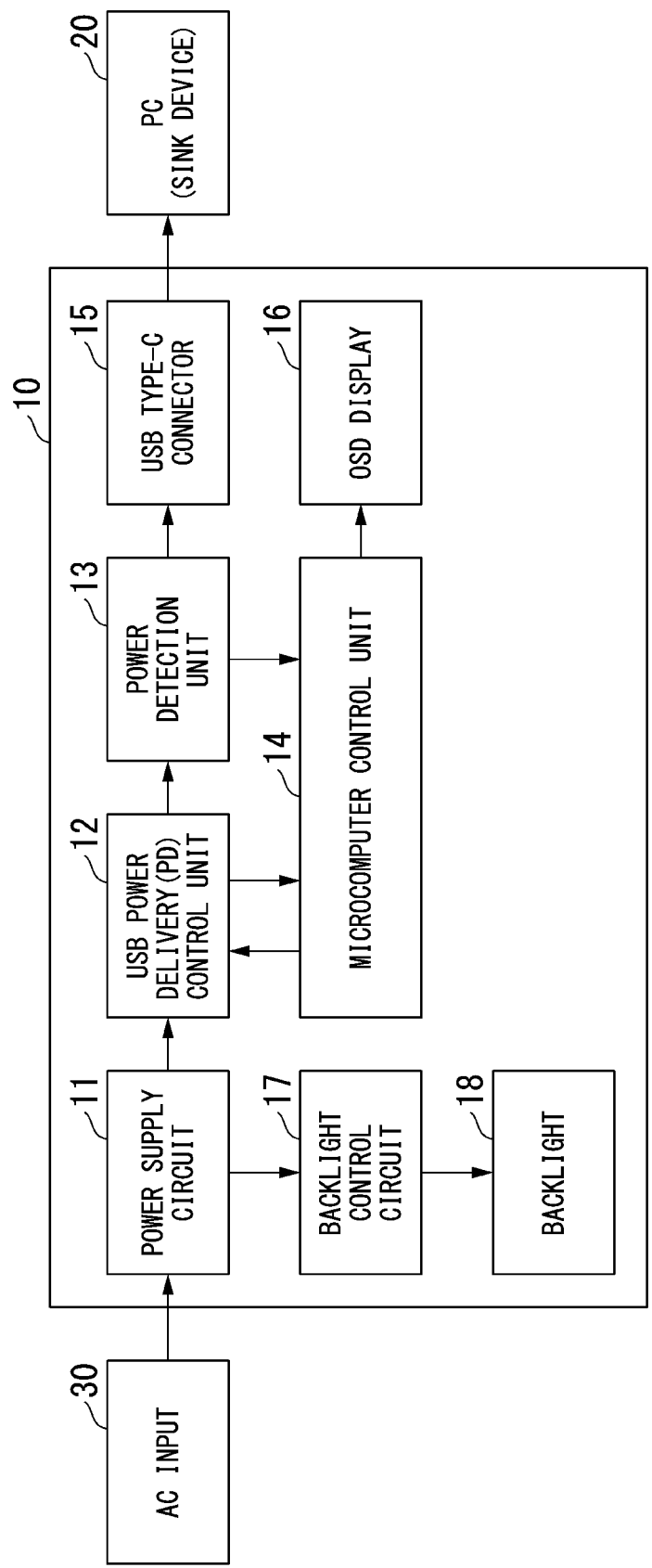
FIG. 3 is a block diagram which shows a configuration example of a source device according to an embodiment of the present invention.

Hereinafter, a configuration of a source device according to an embodiment of the present invention will be described in detail with reference to the drawings. FIG. 3 is a block diagram which shows a configuration example of the source device according to the embodiment of the present invention.

In FIG. 3, the same part as the source device 10a shown in FIG. 1 will be denoted by the same reference numeral, and the description thereof will be omitted.

The LCD monitor (a source device) 10 (hereinafter referred to as a source device 10) is configured to include the power supply circuit 11, a USB Power Deliverly (PD) control unit 12 (hereinafter referred to as a first control unit 12), the power detection unit 13, and a microcomputer control unit (CPU) 14 (hereinafter referred to as a second control unit 14), the USB Type-C connector 15, an OSD display 16, the backlight control circuit 17, and the backlight 18.

As shown in FIG. 3, for example, when the source device 10 is set to an LCD monitor, which is a display device such as a display, and the sink device 20 is set to a PC, which is a laptop, the second control unit 14 that is a microcomputer control unit (CPU) is mounted in the source device 10 to transmit information on the power detection unit 13 and information on the first control unit 12, which is a signal control unit, (voltage and current values of the power supplied from the source device 10 to the sink device 20, which are determined by communication (negotiation) between the source device 10 and the sink device 20) to the microcomputer control unit (CPU). The second control unit 14, which is a microcomputer control unit (CPU), analyzes the received information and gives an instruction to the first control unit 12, which is a USB Power Delivery (USB PD) control unit.

The first control unit 12, which is a USB Power Delivery (USB PD) control unit, controls a supply of power to the sink device 20 on the basis of the USB Power Delivery standard.

The power detection unit 13 detects the voltage and current values of the power required by the sink device 20 and transmits these to the second control unit 14, which is a microcomputer control unit.

That is, the source device 10 is a source device that is connected to the sink device 20 and supplies power to the sink device 20. In addition, the source device 10 includes the first control unit 12, the power detection unit 13, and the second control unit 14.

Here, the first control unit 12 performs a negotiation with the sink device 20 on the basis of the USB Power Delivery standard (a predetermined power standard), and performs control to supply power to the sink device 20 on the basis of the first power information determined by the negotiation.

The power detection unit 13 detects power required by the sink device 20.

The second control unit 14 receives the first power information including the voltage value and the current value of power determined by the negotiation from the first control unit 12 and the second power information including the detected voltage value and current value of power from the power detection unit 13.

The second control unit 14, which is a microcomputer control unit, ascertains the information on the power detection unit 13 and the first control unit 12, which is a USB Power Delivery (USB PD) control unit, and when the power detection unit 13, which is a power control unit, embedded on the source device 10 side detects that the sink device 20 tries to flow in excess of a current determined by the negotiation, an instruction to reduce power (PDO; Power Data Object) that can be supplied by the USB Type-C connector is given from the second control unit 14, which is a microcomputer control unit, to the first control unit 12, which is a USB Power Delivery (USB PD) control unit, and re-communication (re-negotiation) between the source device 10 and the sink device 20 is performed.

That is, the second control unit 14 generates third power information including a voltage value and a current value on the basis of the input first power information and second power information (both types of power information) and a predetermined power standard, and instructs the first control unit 12 to perform a negotiation again using the generated third power information.

The power detection unit 13, which is a power control unit, also detects output power again and transmits it to the second control unit 14, which is a microcomputer control unit. It is calculated and determined whether the threshold value of the protection function (OCP) set by the second control unit 14, which is the microcomputer control unit, is exceeded.

When the threshold value is not exceeded, the first control unit 12 supplies power to the sink device 20 using the previously reduced power (PDO), which is reset power.

In addition, when it is exceeded, the instruction to reduce power (PDO) that can be supplied by the USB Type-C connector is given from the second control unit 14, which is a microcomputer control unit, to the first control unit 12, which is a USB Power Delivery (USB PD) control unit, again and re-communication (re-negotiation) between the source device 10 and the sink device 20 is performed. This work is repeatedly performed while power is normally supplied.

FIG. 4 is a diagram for describing adjustment of a power supply capacity performed by the second control unit 14 shown in FIG. 3.

That is, a threshold value of OCP overcurrent protection is set in the second control unit 14, which is a microcomputer control unit (CPU) of the LCD monitor, and current information (a current value in the second power information) detected from the power detection unit 13 is processed. When the second control unit 14, which is the microcomputer control unit (CPU), determines that a current flowing through the sink device 20 exceeds the threshold value of OCP overcurrent protection, it instructs the first control unit 12, which is a USB Power Delivery (USB PD) control unit, to lower the maximum current of the USB Type-C and to perform a re-negotiation.

The first control unit 12, which is a USB Power Delivery (USB PD) control unit, automatically lowers the maximum current of the PDO and performs a re-negotiation according to this instruction. A supply of power starts and a video is displayed normally when there is no overcurrent, and the current is automatically lowered and a re-negotiation is performed when it is determined that there is an overcurrent again. This loop is repeated while the sink device 20 normally displays the video. Although the threshold value of the protection function indicates 120%, this constant can be freely set.

That is, when a current value of the second power information is greater than the set threshold value (the threshold value of OCP overcurrent protection; the threshold value of the protection function shown in FIG. 4) while the first control unit 12 supplies the determined power to the sink device 20 as a result of the negotiation, the second control unit 14 sets the current value of the first power information determined by the negotiation to be lowered by a predetermined current value (for example, 0.5 shown in FIG. 4) in the third power information, and causes the first control unit 12 to perform a negotiation again according to the third power information.

Here, the threshold value (the threshold value of OCP overcurrent protection) is a value set by the second control unit 14 as a current value obtained by multiplying the current value of the first power information by a predetermined multiple (for example, 120% shown in FIG. 4).

In addition, the first control unit 12 generates the first power information by setting a current value of the first power information as a maximum current value in the USB Power Delivery standard (a predetermined power standard) in a first negotiation.

Moreover, the second control unit 14 generates the third power information in second to $N^{th}$ (N is a natural number equal to or greater than 2) negotiations by setting a current value of the third power information to be lower than current values of the third power information generated in the first to $(N-1)^{th}$ negotiations by a predetermined current value (for example, 0.5 shown in FIG. 4).

With the configuration above, the threshold value of the protection function of the first control unit 12, which is the USB Power Delivery (USB PD) control unit, is secured by the second control unit 14, and the power supply capacity is finely adjusted, and thereby the supply of power to the sink device 20 can be continuously performed. As a result, it possible to prevent the supply of power from the source device 10 to the sink device 20 and a video display in the sink device 20 from being stopped.

Second Embodiment

In the first embodiment, it is described that the second control unit 14 causes the first control unit 12 to perform an $(N-1)^{th}$ negotiation using the third power information to control the supply of power to the sink device 20 according to the first power information corresponding to the third power information. As a result, it is an ideal that the supply power (PDO) is reduced too much so that the sink device 20, which is a sink device, does not refuse to receive power. However, since the sink device 20 may refuse to receive power, processing of the source device 10 in such a case will be described.

When the power (PDO) is reduced too much and the sink device 20, which is a sink device, refuses to receive the power, the second control unit 14, which is a microcomputer control unit, gives an instruction of the 5V power supply mode to the first control unit 12, which is a USB Power Delivery (USB PD) control unit. Although the sink device 20, which is a sink device, cannot be charged, it can display a video which satisfies the USB Power Delivery standard. Furthermore, it shows to the OSD display 16 that the source device 10, which is a source device, does not supply power to the sink device 20, which is a sink device.

That is, when the current value set to be lowered by a predetermined current value is greater than a minimum current value of a sink device specified in a predetermined power standard, and is equal to or less than the threshold value, the second control unit 14 causes the first control unit 12 to continue the supply of power.

On the other hand, when the current value set to be lowered by the predetermined current value is equal to or less than the minimum current value of a sink device specified in the predetermined power standard or greater than the threshold value, the second control unit 14 causes the first control unit 12 to stop the supply of power.

Then, when the source device 10 outputs a video to the sink device 20 and the sink device 20 is a device that displays a video indicating the video output, the second control unit 14 causes the first control unit to stop the supply of power.

In addition, the source device 10 has the OSD display 16, and the second control unit 14 causes the OSD display 16 to display information indicating whether to continue the supply of power or to stop the supply of power.

Description of Operations in the First Embodiment and the Second Embodiment

Next, an operation of the source device 10 will be described with reference to FIG. 5. FIG. 5 is a control flowchart which shows a control operation of the source device according to the embodiment of the present invention.

USB PD negotiation is executed (step ST01).

Specifically, the first control unit 12 of the source device 10 performs a negotiation with the sink device 20. At this time, for example, as shown in FIG. 4, when supply power is set to 27 W (watt) and a voltage is set to 9 V (volt), the first control unit 12 sets the maximum current value with a current=(power/9) A (ampere) set to 3 A. That is, the first power information as power information (a voltage value and a current value) includes information indicating the voltage value and current value shown in FIG. 4. In the first negotiation, the first control unit 12 generates the first power information by setting a current value of the first power information as a maximum current value 3 A in the USB Power Delivery standard (a predetermined power standard). Then, the first control unit 12 generates the first power information by setting a current value of the first power information as the maximum current value in the predetermined power standard in the first negotiation to perform control of supplying power to the sink device 20.

Power is supplied using the maximum current of an USB PD standard (step ST02).

Specifically, the first control unit 12 performs control of supplying power, here, power 27 W (the voltage value=9V, the maximum current value=3 A), to the sink device 20 on the basis of the first power information determined by the negotiation.

It is determined whether the set threshold value of the protection function (OCP) is exceeded (step ST03).

Specifically, the second control unit 14 determines whether a current value in the second power information including the voltage value and the current value of the power detected by the power detection unit 13 exceeds the set threshold value of the protection function (OCP). Here, as shown in FIG. 4, it is determined whether the current value in the second power information is greater than 3 A×120%.

Then, when the current value in the second power information is equal to or less than 3 A×120%, the processing returns to step ST02.

On the other hand, if the current value in the second power information is greater than 3 A×120%, the processing proceeds to step ST04.

A current is set to be lower than the maximum current of the USB PD standard (step ST04).

Specifically, the second control unit 14 set the current value of the first power information determined by the negotiation by a predetermined current value (for example, 0.5 shown in FIG. 4) in the third power information. Here, as shown in FIG. 4, the second control unit 14 sets the power 27 W (the voltage value=9V, the maximum current value=3 A), which is the third power information, to be lowered by 0.5, and generates the third power information on the power 27 W (the voltage value=9V and the current value=3 A−0.5).

The USB PD negotiation is performed (step ST05).

Specifically, the first control unit 12 of the source device 10 performs a negotiation with the sink device 20. At this time, the second control unit 14 causes the first control unit 12 to perform a re-negotiation (a second negotiation) according to the third power information.

Power is supplied using the reset current (step ST06).

Specifically, the first control unit 12 performs control of supplying power, here, power 27 W (the voltage value=9 V and the current value=3 A−0.5), to the sink device 20 on the basis of the first power information determined by the negotiation (the third power information instructed by the second control unit 14).

It is determined whether the set threshold value of the protection function (OCP) is exceeded (step ST07).

Specifically, the second control unit 14 determines whether the current value in the second power information including the voltage value and the current value of the power detected by the power detection unit 13 exceeds the set threshold value of the protection function (OCP). Here, as shown in FIG. 4, it is determined whether the current value in the second power information is greater than (3 A−0.5)×120%.

Then, when the current value in the second power information is equal to or less than (3 A−0.5)×120%, the processing returns to step ST06.

On the other hand, if the current value in the second power information is greater than (3 A−0.5)×120%, the processing proceeds to step ST08.

The current is set to be lower than the reset current (step ST08).

Specifically, the second control unit 14 sets the current value of the first power information determined by the negotiation to be lowered by a predetermined current value (for example, 0.5 shown in FIG. 4) in the third power information. Here, as shown in FIG. 4, the second control unit 14 sets the power 27 W (the voltage value=9V, the current value=3 A−0.5), which is the third power information, to be lowered by 0.5, and generates third power information on the power 27 W (the voltage value=9V, the current value=3 A−0.5×2).

The USB PD negotiation is performed (step ST09).

Specifically, the first control unit 12 of the source device 10 performs a negotiation with the sink device 20. At this time, the second control unit 14 causes the first control unit 12 to perform a second re-negotiation (a third negotiation) according to the third power information.

The current is set to be lower than the reset current (step ST10).

Specifically, the first control unit 12 performs control of supplying power, here, power 27 W (the voltage value=9 V, the current value=3 A−0.5×2), to the sink device 20 on the basis of the first power information determined by the negotiation (the third power information instructed by the second control unit 14).

As described above, it has been described that negotiation is performed for N (here, N=3) times, and re-negotiation is performed for (N−1) times (here, 2 times) in the source device 10 in the first embodiment.

That is, by repeating operations of "ST03 to ST06" or "ST07 to ST10" described above (repeating the loop), that is, by performing negotiations for N times (N≥3), and performing re-negotiations for (N−1) times, the supply of power to the sink device 20 can be continued without being stopped.

Hereinafter, an operation of the source device 10 in the second embodiment will be described.

Then, while re-negotiation is performed for (N−1) times, when the power (PDO) is reduced too much in processing corresponding to step ST10 in any of the re-negotiations, and the sink device 20, which is a sink device, refuses to receive the power in processing corresponding to step ST09 in a next re-negotiation, the second control unit 14, which is a microcomputer control unit, gives an instruction of the 5V power supply mode to the second control unit 14, which is a USB Power Delivery (USB PD) control unit. That is, in the processing corresponding to step ST10 in a next re-negotiation, the first control unit 12 performs control of supplying power, here, for example, power 15 W (the voltage value=5 V, the current value=3 A−0.5×m) (m is a natural number equal to or greater than 0), to the sink device 20 on the basis of the first power information determined by the negotiation (the third power information instructed by the second control unit 14).

It is determined whether the set current exceeds a current Min used by the sink device and does not exceed the threshold value of (OCP) (step ST11).

Specifically, the second control unit 14 determines whether the current value set to be lowered by a predetermined current value is greater than the minimum current value of the sink device specified in a predetermined power standard and is equal to or less than the threshold value.

When it is greater than the minimum current value of the sink device specified in the predetermined power standard and is equal to or less than the threshold value, the processing proceeds to step ST12.

The supply of power and the video display of USB PD are performed (ST12).

Specifically, the second control unit 14 causes the first control unit 12 to continue the supply of power. As a result, the sink device 20 supplies power to the sink device 20 without stopping the video display.

On the other hand, when the current value set to be lowered by a predetermined current value is equal to or less than the minimum current value of the sink device specified in the predetermined power standard or is greater than the threshold value, the processing proceeds to step ST13.

USB PD power supply is stopped (step ST13).

Specifically, the second control unit 14 instructs the first control unit 12 to stop a supply of power, and stops the supply of power to the sink device 20.

That is, when the source device 10 outputs a video to the sink device 20 and the sink device 20 is a device that displays a video indicating the video output, the second control unit 14 instructs the first control unit 12 to stop the supply of power.

The video display is performed (step ST14).

When the first control unit 12 is instructed to stop the supply of power, the source device 10 cannot charge the sink device 20, but the sink device 20 can display a video satisfying the USB Power Delivery standard.

USB PD information is displayed on the OSD display (step ST15).

Specifically, the source device 10 has an OSD display 16, and the second control unit 14 causes the OSD display 16 to display information indicating whether to continue the supply of power or to stop the supply of power.

Next, a minimum configuration of the embodiments described above will be described with reference to FIG. 6. FIG. 6 is a block diagram which shows a basic configuration example of the source device according to the embodiment of the present invention.

The source device 10 of the present embodiment is a source device that is connected to the sink device 20 and supplies power to the sink device 20, and is a source device that includes the first control unit 12, the power detection unit 13, and the second control unit 14.

A negotiation between the first control unit 12 and the sink device 20 is performed on the basis of the USB Power Delivery standard (a predetermined power standard), and control of supplying power to the sink device 20 is performed on the basis of the first power information determined by the negotiation.

The power detection unit 13 detects the power required by the sink device 20.

The second control unit 14 receives the first power information including the voltage value and the current value of power determined by the negotiation from the first control unit 12 and the second power information including the voltage value and the current value of power detected from the power detection unit 13, generates the third power information including the voltage value and the current value on the basis of the received first power information and second power information (both pieces of power information) and the USB Power Delivery standard (a predetermined power standard), and instructs the first control unit 12 to perform a negotiation again using the generated third power information.

As described above, according to the embodiment of the present invention, and the minimum configuration example, the threshold value of the protection function of the first control unit 12 is secured by the second control unit 14, and the supply of power to the sink device 20 can be continuously performed by finely adjusting the power supply capacity. As a result, it is possible to prevent the supply of power from the source device 10 to the sink device 20 and the video display in the sink device 20 from being stopped.

As described above, the embodiments of the present invention have been described in detail with reference to the drawings, but a specific configuration is not limited to these embodiments, and includes a design and the like within a range not departing from the gist of the present invention. In addition, a part or all of programs executed by a computer such as one or more CPUs included in the embodiments described above can be distributed via a communication line or a computer-readable recording medium.

REFERENCE SIGNS LIST

10, 10*a* Source device
11 Power supply circuit
12, 12*a* First control unit
13, 13*a* Power detection unit
14 Second control unit
15 USB Type-C connector
16 OSD display 17 Backlight control circuit
18 Backlight
20 Sink device
30 AC INPUT

What is claimed is:

1. A source device that is connected to a sink device to supply power to the sink device, the source device comprising:
one or more memories that store processor-executable instructions,
one or more hardware processors configured to execute the processor-executable instructions to cause the one or more hardware processors to:
perform negotiation with the sink device on the basis of a predetermined power standard;
perform control of supplying power to the sink device on the basis of a first power information determined by the negotiation;
detect power required by the sink device;
receive an input of the first power information, wherein the first power information has been determined by the negotiation, and the first power information includes a voltage value and a current value of power;
receive an input of a second power information, wherein the second power information includes a voltage value and a current value of power detected;
generate a third power information, wherein the third power information includes a voltage value and a current value on the basis of both the inputs of the first power information and the second power information and on the basis of the predetermined power standard;
perform negotiation with the sink device again on the basis of the third power information generated; and
when a current value of the second power information gets greater than a set threshold value while a power determined being supplied to the sink device as a result of the negotiation, change the third power information by setting the current value of the first power information determined by the negotiation to be lowered by a predetermined current value in the third power information, and perform negotiation with the sink device again on the basis of the third power information changed.

2. The source device according to claim 1,
wherein the threshold value is set as a current value obtained by multiplying a current value of the first power information by a predetermined multiple.

3. The source device according to claim 1,
wherein the first power information is generated by setting a current value of the first power information as a maximum current value which comply with the predetermined power standard in a first time of negotiation with the sink device.

4. The source device according to claim 3,
wherein the third power information in second to $N^{th}$ (N is a natural number equal to or greater than 2) negotiations is generated by setting a current value of the third power information to be lower than current values of the third power information generated in the first to $(N-1)^{th}$ times of negotiation with the sink device by a predetermined current value.

5. The source device according to claim 4,
wherein when the current value that is set to be lowered by the predetermined current value gets greater than a minimum current value of the sink device specified in the predetermined power standard and is equal to or less than the threshold value, to continue supplying power to the sink device.

6. The source device according to claim 4,
wherein when the current value set to be lowered by the predetermined current value is equal to or less than the minimum current value of the sink device specified in the predetermined power standard or is greater than the threshold value, to stop supplying power to the sink device.

7. The source device according to claim 5,
wherein the source device has an OSD display, and
the OSD display displays information indicating whether to continue or stop supplying power to the sink device.

8. The source device according to claim 6,
wherein the source device has an OSD display, and
the OSD display displays information indicating whether to continue or stop supplying power to the sink device.

9. The source device according to claim 6,
wherein when the source device outputs a video to the sink device wherein the sink device is a device configured to display a video indicating the video output, to stop supplying power to the sink device.

10. A control method by one or more hardware processors when executing processor-executable instructions stored in one or more memories in a source device that is connected to a sink device to supply power to the sink device, the method comprising:
performing negotiation with the sink device on the basis of a predetermined power standard;
performing control of supplying power to the sink device on the basis of first power information determined by the negotiation;
detecting power required by the sink device;
receiving an input of the first power information, wherein the first power information has been determined by the negotiation, and the first power information includes a voltage value and a current value of power;
receiving an input of a second power information, wherein the second power information includes a voltage value and a current value of power detected;
generating a third power information, wherein the third power information includes a voltage value and a current value on the basis of both the inputs of the first power information and the second power information and on the basis of the predetermined power standard;
performing negotiation with the sink device again on the basis of the third power information generated; and
when a current value of the second power information gets greater than a set threshold value while a power determined being supplied to the sink device as a result of the negotiation, changing the third power information by setting the current value of the first power information determined by the negotiation to be lowered by a predetermined current value in the third power information, and performing negotiation with the sink device again on the basis of the third power information changed.

11. The control method according to claim 10,
wherein the threshold value is set as a current value obtained by multiplying a current value of the first power information by a predetermined multiple.

12. The control method according to claim 10,
wherein the first power information is generated by setting a current value of the first power information as a maximum current value which comply with the predetermined power standard in a first time of negotiation with the sink device.

13. The control method according to claim 12,
wherein the third power information in second to $N^{th}$ (N is a natural number equal to or greater than 2) negotiations is generated by setting a current value of the third power information to be lower than current values of the third power information generated in the first to $(N-1)^{th}$ times of negotiation with the sink device by a predetermined current value.

14. The control method according to claim 13, further comprising:
when the current value that is set to be lowered by the predetermined current value gets greater than a minimum current value of the sink device specified in the predetermined power standard and is equal to or less than the threshold value, continuing supplying power to the sink device.

15. The control method according to claim 13, further comprising:
when the current value set to be lowered by the predetermined current value is equal to or less than the minimum current value of the sink device specified in the predetermined power standard or is greater than the threshold value, stopping supplying power to the sink device.

16. The control method according to claim 14, further comprising:
causing an OSD display of the source device to display information indicating whether to continue or stop supplying power to the sink device.

17. The control method according to claim 15, further comprising:
causing an OSD display of the source device to display information indicating whether to continue or stop supplying power to the sink device.

18. The control method according to claim 15, further comprising:
when the source device outputs a video to the sink device wherein the sink device is a device configured to display a video indicating the video output, stopping supplying power to the sink device.

* * * * *